United States Patent [19]

Maxwell

[11] Patent Number: 4,543,840
[45] Date of Patent: Oct. 1, 1985

[54] TRANSMISSION APPARATUS

[76] Inventor: Jerrold F. Maxwell, 4304 Cedarwood, Matteson, Ill. 60443

[21] Appl. No.: 424,362

[22] Filed: Sep. 27, 1982

[51] Int. Cl.$^4$ ............ F16H 3/22; F16H 3/08; F16D 21/04; F16D 11/04
[52] U.S. Cl. .................. 74/342; 74/346; 74/329; 74/331; 74/333; 192/20; 192/67 R
[58] Field of Search ............. 74/331, 342, 344, 346, 74/332, 333, 335, 329; 192/20, 85 A, 67 R

[56] References Cited

U.S. PATENT DOCUMENTS

| | | | |
|---|---|---|---|
| 1,724,202 | 8/1929 | Jacobs | 74/331 X |
| 1,805,753 | 5/1931 | Boileau | 74/342 X |
| 1,947,829 | 2/1934 | Cole | 74/333 |
| 2,145,979 | 2/1939 | Friedman | 71/336.5 |
| 2,162,979 | 6/1939 | Simpson | 74/342 |
| 2,456,894 | 12/1948 | Ryker | 74/343 |
| 2,553,376 | 5/1951 | Tourneau | 74/331 X |
| 2,835,136 | 5/1958 | Berthiez | 74/346 X |
| 2,881,626 | 4/1959 | Morris | 74/342 |
| 3,025,711 | 3/1962 | Sommer | 74/342 |
| 3,451,285 | 6/1969 | Snyder | 74/331 X |
| 3,703,031 | 11/1972 | Fodrea | 29/469 |
| 4,228,694 | 10/1980 | Adam | 74/342 |

FOREIGN PATENT DOCUMENTS

| | | | |
|---|---|---|---|
| 363963 | 8/1926 | France | 74/331 |
| 327332 | 7/1935 | Italy | 74/331 |
| 466223 | 10/1951 | Italy | 74/331 |
| 74656 | 12/1953 | Netherlands | 74/331 |
| 599800 | 3/1948 | United Kingdom | 74/331 |

OTHER PUBLICATIONS

"Power Shifting", Jun. 1938, pp. 20, 22-23.

Primary Examiner—Allan D. Herrmann
Assistant Examiner—Stephen B. Andrews
Attorney, Agent, or Firm—Basile, Weintraub & Hanlon

[57] ABSTRACT

A transmission apparatus includes a large number of selectable gear ratios. The transmission apparatus includes first and second primary gears mounted on rotatable shafts having offset axes of rotation. A plurality of pairs of secondary gears, each including first and second secondary gears, selectively engage the first and second primary gears. The first and second secondary gears of one of the pairs of secondary gears are selectively coupled together and engage the first and second primary gears to transmit power from a power source at a predetermined gear ratio to drive a load.

6 Claims, 12 Drawing Figures

TRANSMISSION APPARATUS

BACKGROUND OF THE INVENTION

1. Field of the Invention

This invention relates, in general, to transmissions, and, more specifically, to transmissions having a plurality of selectable forward and reverse modes of operation.

2. Description of the Prior Art

The modern automobile is undergoing a dramatic change in design due to government regulations relating to safety and emission standards and, also, due to the ever increasing cost of fuel. All of these factors have resulted in the development of smaller, lighter vehicles which necessarily have smaller and less powerful engines.

Due to the low horsepower provided by these smaller engines, transmissions are required which provide a wide range of gear ratios in order to maintain satisfactory drivability over a wide range of driving conditions and, also, high fuel economy. A narrow range of engines RPM's is also essential in order to maintain the desired emission levels. This again illustrates the need for a transmission having a wide range of gear ratios.

While it is known to construct vehicle transmissions having multiple gear ratios, such transmissions have a long overall length which, while acceptable for use in larger vehicles, cannot be adapted for use in smaller vehicles due to space constraints. The space constraints placed in vehicle transmission design is further aggravated in front wheel drive type vehicles having transverse mounted engines. In such a vehicle configuration, the engine, transmission and drive train are located entirely between the front wheels of the vehicle which, in small vehicles, is an extremely limited space. This narrow space has prevented the use of previously devised transmissions having the desired number of gear ratios for satisfactory driving under all conditions, maximum fuel economy and low emissions.

Similiar space constraints and/or the need for a large number of selectable gear ratios are also encountered in other types of motive power apparatus, such as lathes and other machine tools, farm vehicle, fluid mixers, etc.

Thus, it would be desirable to provide a transmission for a vehicle which overcomes the problems of previously devised transmissions. It would also be desirable to provide a transmission which includes a wide range of selectable gear ratios. It would also be desirable to provide a transmission which provides a wide range of gear ratios in a small, compact space. It would also be desirable to provide a transmission which can be constructed in a variety of different configurations for use in a large number of applications and vehicle and engine configurations. Finally, it would be desirable to provide a transmission which is particularly suited for use in transverse mounted, front wheel drive vehicles.

SUMMARY OF THE INVENTION

There is disclosed a unique transmission apparatus which provides a wide range of selectable gear ratios. The transmission apparatus includes first and second primary gears, each mounted on a rotatable shaft, with the rotatable shafts having offset axes of rotation.

A plurality of pairs of secondary gears, each including first and second secondary gears co-axially disposed for rotation about a common axis, are disposed for selective engagement with the first and second primary gears, respectively. Means are provided for coupling the first and second secondary gears of one of the pair of secondary gears into rotational engagement with the first and second primary gears. In this manner, one of the pairs of secondary gears may be coupled together into rotational engagement with the first and second primary gears such that the power input into the transmission apparatus is transferred through the first primary gear, the selected pair of secondary gears and the second primary gear at a preselected gear ratio to drive an output load. Alternate pairs of secondary gears may be selectably engaged with the first and second primary gears to provide different gear ratios.

The transmission apparatus of the present invention overcomes many of the problems associated with previously devised vehicle transmissions in that it provides a large number of gear ratios. In addition, the transmission apparatus of the present invention provides the large number of gear ratios in a small compact space which enhances its use in today's smaller automobiles and other types of machines. Finally, the transmission apparatus of the present invention may be provided in a large number of configurations so as to enable its use in a variety of applications.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
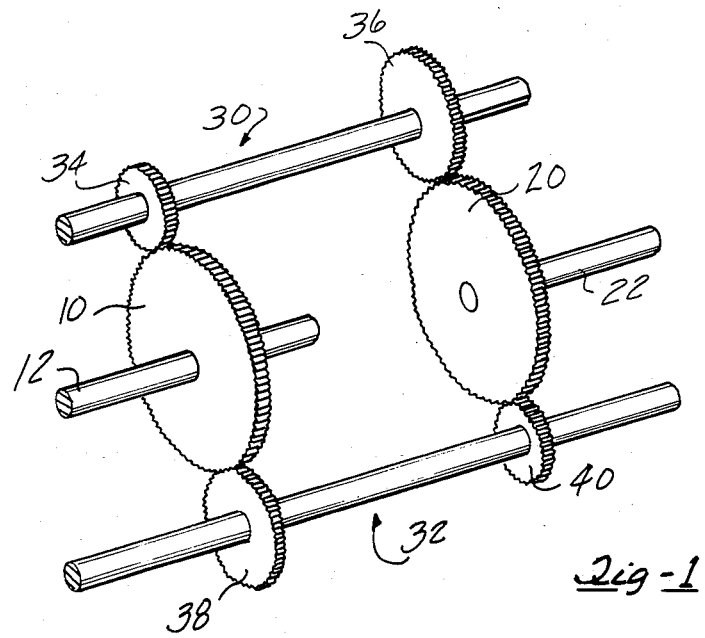
FIGS. 1, 2, 3, 4, 5 and 6 are perspective, pictorial representations of alternate embodiments of a transmission apparatus constructed in accordance with the teachings of the present invention.

Throughout the following description and drawing, identical reference numbers are used to refer to the same components shown in multiple figures of the drawing.

In general, the present invention relates to a transmission apparatus which is suitable for use in powering vehicles, such as automobiles, trucks, busses, and other machines, such as lathes, mixers, etc. The transmission apparatus includes a plurality of selectable forward and reverse gear ratios and a unique configuration which enables the plurality of forward and reverse gear ratios to be provided in a small, compact space.

I. General Concept

Referring now to FIGS. 1-6, there is illustrated a pictorial representation of the general concept of the transmission apparatus of the present invention.

In each embodiment, the transmission apparatus of the present invention includes first and second primary gears 10 and 20, respectively, each mounted on rotatable shafts 12 and 22. The rotatable shafts 12 and 22 are oriented with offset, parallel axes of rotation.

A plurality of pairs of secondary gears, each including first and second gears co-axially arranged for rotation about a common axis, are disposed for selective engagement with the first and second primary gears 10 and 20, respectively. As shown in FIG. 1, two pairs of secondary gears 30 and 32 are associated with the first and second primary gears 10 and 20. Each of the pairs of secondary gears 30 and 32 includes first and second secondary gears, such as secondary gears 34 and 36 for the secondary gear pair 30 and secondary gears 38 and 40 for the secondary gear pair 32. The first secondary gear, such as secondary gears 34 and 38 of each pair of secondary gears 30 and 32, is adapted to selectively engage the first primary gear 10; while the second secondary gears 36 and 40 of each pair of secondary gears 30 and 32 is adapted to selectively engage the second primary gear 20.

For purposes of clarity and a thorough understanding of the present invention, each of the secondary gears of each pair of secondary gears is depicted as being coupled to the corresponding secondary gear of each pair of secondary gears and is disposed in engagement with its associated primary gear. It will be understood, however, that in an actual use, as will be described in greater detail hereafter, one of the secondary gears of each pair of secondary gears is normally engaged from its associated primary gear. The other secondary gear of each secondary gear pair is not normally coupled to the corresponding first secondary gear or engaged with its associated primary gear; but is brought into engagement with its associated primary gear and is coupled for rotational movement to the corresponding secondary gear only when a particular secondary gear pair is selected.

As noted above, each pair of secondary gears, such as secondary gear pairs 30 and 32, is provided with means for coupling the first and second secondary gears of the pair of secondary gears into engagement for simultaneous co-axial rotation, as will be described and illustrated in greater detail hereafter.

In the embodiment illustrated in FIG. 1, two pairs of secondary gears 30 and 32 are provided for selective engagement with the first and second primary gears 10 and 20. Each pair of secondary gears 30 and 32 is configured to have a distinct gear ratio. Thus, when the coupled secondary gears 34 and 36 of the first secondary gear pair 30 are selectively brought into simultaneous and respective rotational engagement with the first and second primary gears 10 and 20, a first gear ratio will be provided between the input and output of the transmission apparatus. Correspondingly, when the coupled secondary gears 38 and 40 of the second pair 32 of secondary gears are brought into simultaneous engagement with the first and second primary gears 10 and 20, a second, different gear ratio will be provided.

Figure 2:
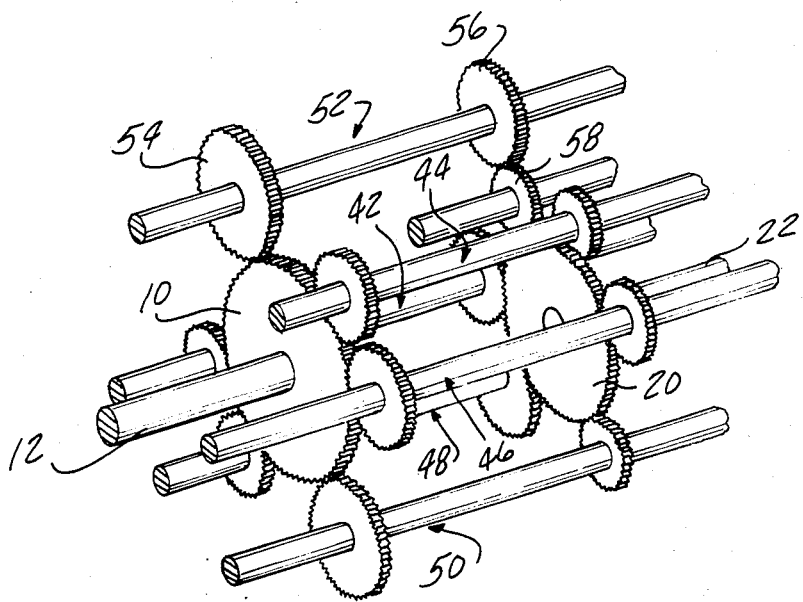

The actual number of pairs of secondary gears which may be provided with the first and second primary gears 10 and 20 is based on size constraints for the transmission apparatus as well as the number of gear ratios that are necessary for the particular application in which the transmission apparatus is utilized. Thus, as shown in FIG. 2, six pairs of secondary gears 42, 44, 46, 48, 50 and 52 are provided for selective engagement with the first and second primary gears 10 and 20. As before, each pair of secondary gears 42, 44, 46, 48, 50 and 52 includes first and second secondary gears, such as secondary gears 54 and 56 for the secondary gear pair 52, each being adapted for selective engagement with the first and second primary gears 10 and 20, respectively. It should also be noted, in the embodiment depicted in FIG. 2, that the transmission apparatus is provided with a reverse idler gear 58 which is mounted on a rotatable shaft. The reverse idler gear 58 is interposed between the secondary gear 56 and the second primary gear 20 so as to reverse the direction of rotation of the secondary gear 20 and thereby provide a reverse output transmission apparatus. Thus, in the embodiment illustrated in FIG. 2, five forward gear ratios and one reverse gear ratio are provided.

Figure 3:
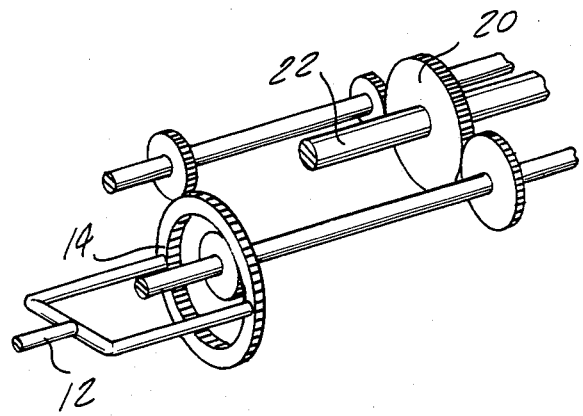

In the embodiments illustrated in FIGS. 1 and 2, the first and second primary gears 10 and 20 are formed with external gear teeth. It is also possible, as illustrated in FIG. 3, to form one or both of the primary gears with internal gear teeth. The corresponding secondary gear is disposed for engagement with the internal gear teeth on one or both of the primary gears. Thus, in the embodiment illustrated in FIG. 3, primary gear 14 is formed with internal gear teeth and rotates about an axis of rotation of 12'.

Input power to the transmission apparatus of the present invention may be applied to and taken from any of the rotational shafts of the primary or secondary gears. Thus, in the embodiments illustrated in FIGS. 1 and 2, input driving power, from a power source, such as an engine or motor, is applied to the rotational shaft 12 of the first primary gear 10, with output or driven force being provided at the rotatable shaft 22 of the second primary gear 20, which then can be applied to a load.

Figure 4:
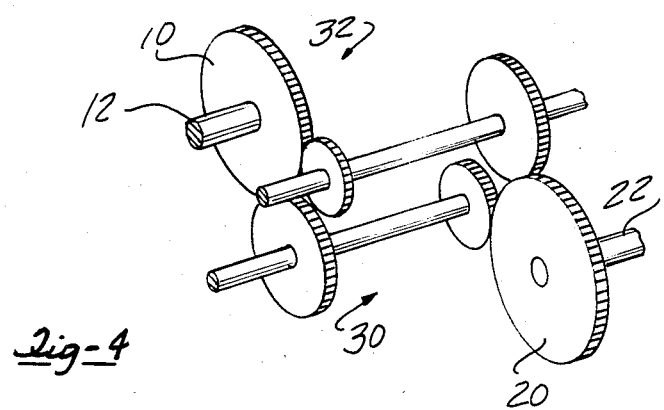

In the embodiment depicted in FIG. 4, the primary gears 10 and 20 are disposed on opposite sides of the secondary gear pairs 30 and 32. Input driving power may be applied to the rotatable shaft of one of the secondary gear pairs, such as secondary gear pair 30, with output driving force being taken out from the transmission apparatus on the rotatable shaft 22 of the second primary gear 20.

Figure 5:
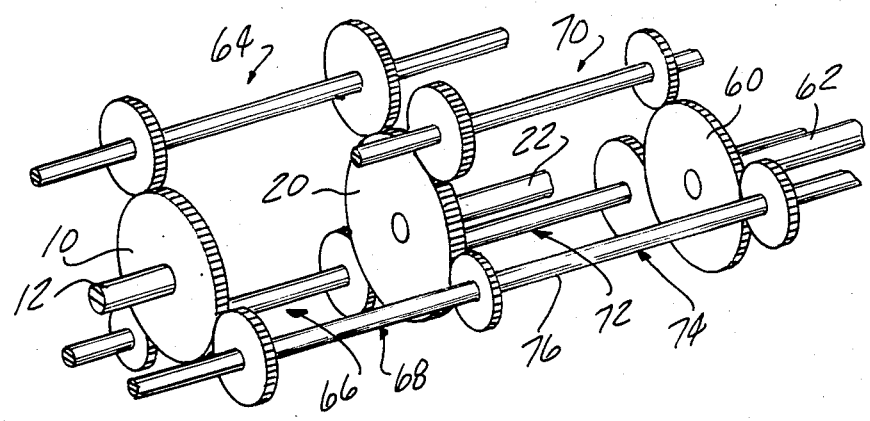

Additional primary gears and associated secondary gear pairs may also be staged with the first and second primary gears to increase the number of available gear ratios. As shown in FIG. 5, a third primary gear 60 is mounted on a rotatable shaft 62 which may be coaxial with axis 12 of the first primary gear 60 or offset from both of the axes of rotation of the first and second primary gears 10 and 20. Three pairs of secondary gears 64, 66 and 68 are associated with the first and second primary gears 10 and 20 to provide three gear ratios in the first stage between primary gears 10 and 20. Three pairs of secondary gears 70, 72 and 74 are associated with the second and third primary gears 20 and 60 to provide three gear ratios in the second stage between primary gears 20 and 60. Thus, nine gear ratios may be provided in this multi-stage transmission configuration by selectively and simultaneously coupling any one of the secondary gear pairs 64, 66 and 68 with the first and second primary gears 10 and 20 and any one of the secondary gear pairs 70, 72 and 74 with the second and third primary gears 20 and 60.

It should also be noted that the secondary gear pairs associated with the first and second primary gears and the second and third primary gears may be mounted on separate rotatable shafts or along a common shaft 76 on which are mounted on the secondary gear pairs 68 and 74 associated with the first, second and third primary gears 10, 20 and 60.

Figure 6:
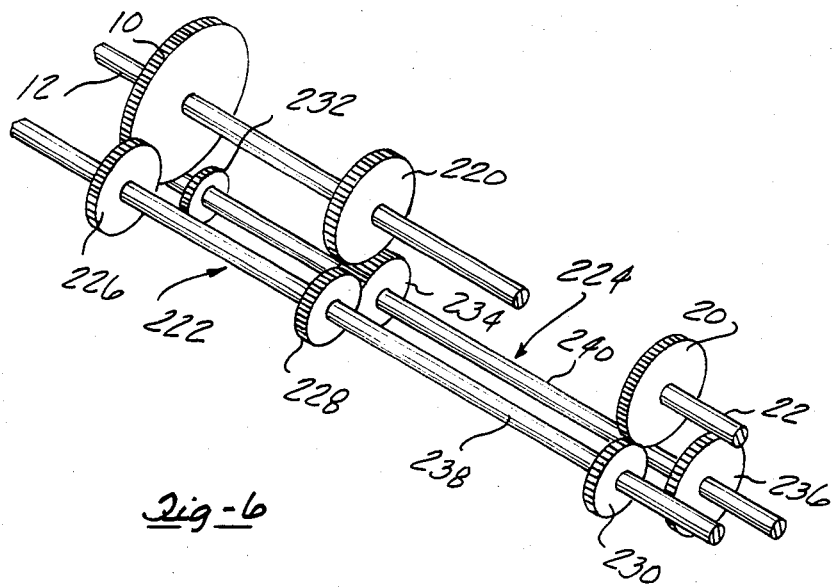

Another embodiment of the transmission apparatus of the present invention is depicted in FIG. 6 in which first and second primary gears 10 and 20 are mounted on rotatable offset shafts 12 and 22, respectively. An auxiliary primary gear 220 is mounted on shaft 12.

Secondary gear sets 222 and 224 are associated with the primary gears 10, 20 and 220 and respectively include secondary gears 226, 228 and 230, and 232, 234 and 236. Some or all of the secondary gears slide on rotatable shafts 238 and 240 to engage or disengage the primary gears 10, 20 and 220 or the other secondary gears.

The incorporation of the gear configuration shown in FIG. 6 in a transmission provides many possible gear ratio possibilities. By way of example, auxiliary primary gear 220 may engage either of secondary gears 228 or 234 to provide additional gear ratios beyond that afforded by primary gears 10 and 20. In addition, secondary gears 228 and 234, when engaged and gear 234 is simultaneously engaged with gear 220 and gear 230 is engaged with primary gear 20, provide a reverse mode of operation for the output of the transmission apparatus.

II. Implementation

Figure 7:
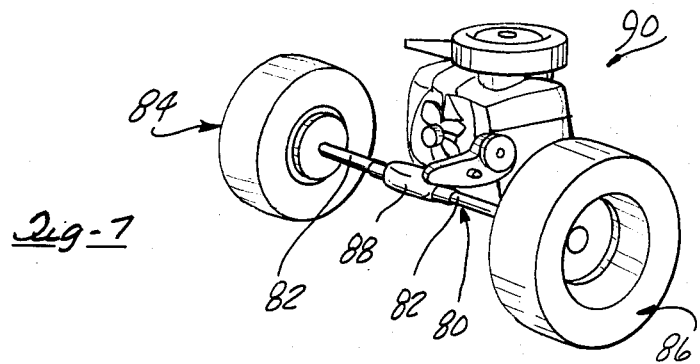
FIG. 7 is a partial perspective view illustrating the use of a transmission apparatus constructed in accordance with the teachings of the present invention on a front wheel drive vehicle having a transverse mounted engine.

Referring now to FIG. 7, there is illustrated an implementation of the transmission apparatus 80 constructed in accordance with the teachings of the present invention on a vehicle, such as a front wheel drive vehicle. Such a vehicle, as is conventional, includes front axles 82 extending between wheels 84 and 86 and a differential 88. An engine 90, which may be transversely mounted between the front wheels 84 and 86 is operatively connected to the differential 88 for powering the front wheels 84 and 86 by means of the transmission apparatus 80.

Figure 8B:
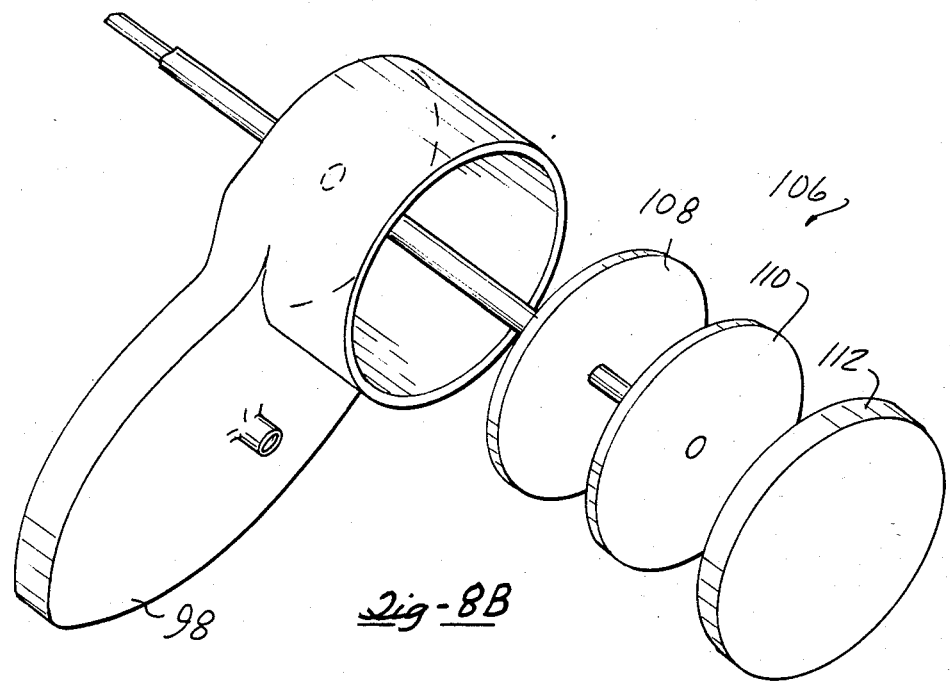
FIGS. 8A and 8B are exploded perspective views of the construction of a transmission apparatus for use with the engine and drive train configuration illustrated in FIG. 7.
Figure 8A:
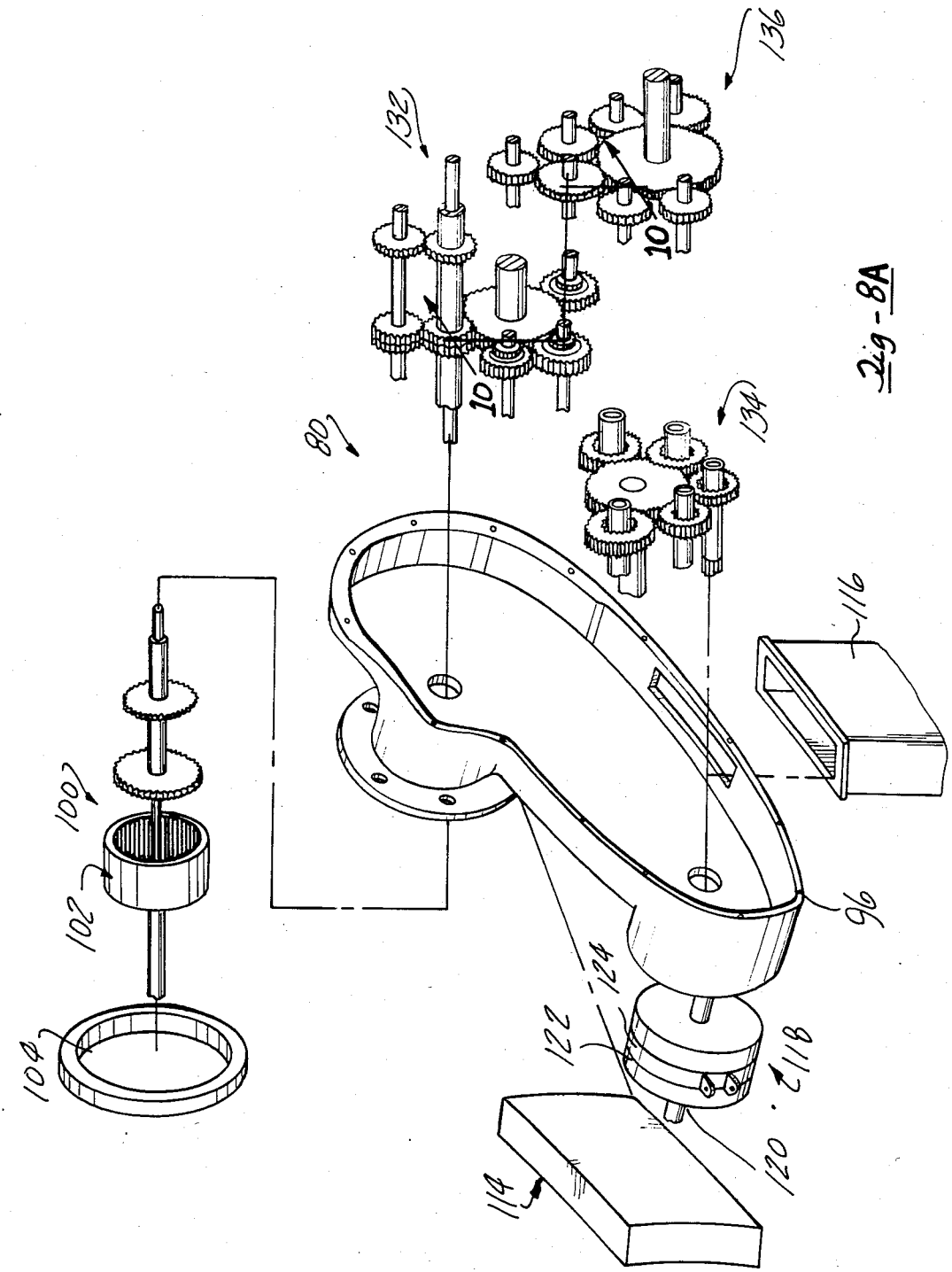
Figure 9:
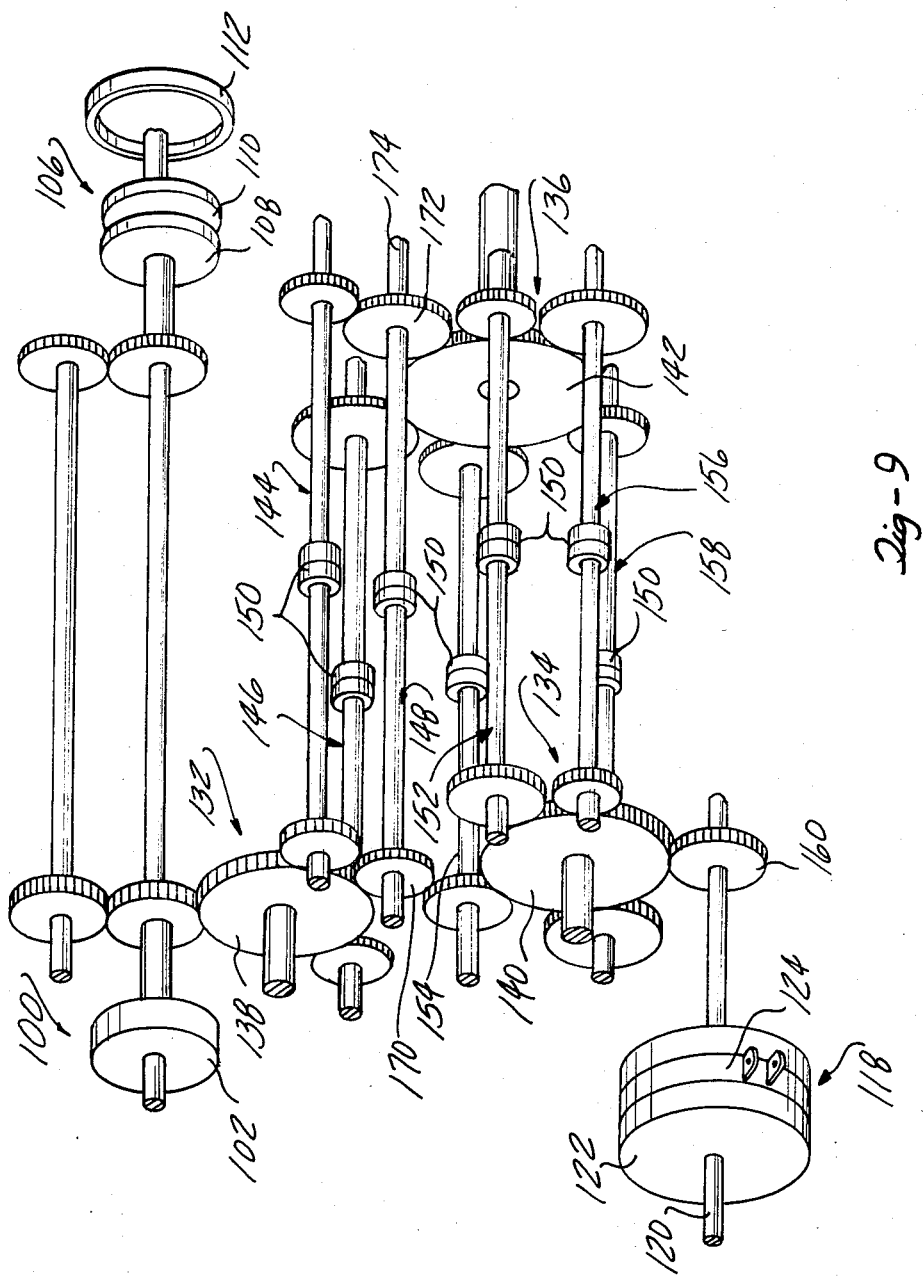
FIG. 9 is a pictorial perspective view of the transmission apparatus illustrated in FIG. 8 showing the various gear components thereof.

As shown in FIGS. 8A, 8B, and 9, the transmission apparatus 80 includes a housing formed of first and second cover portions 96 and 98, respectively. The first and second cover portions 96 and 98 have a recessed configuration for housing and mounting the operational components of the transmission apparatus 80 therein.

As shown symbolically in FIG. 8A, an engine output assembly 100 which includes a lock-in clutch 102 is provided for connecting rotational output of the engine 90 to the transmission apparatus 80 directly or selectively through a torque convertor 106. The lock-in clutch 102 is mounted within the cover portion 96 of the transmission apparatus 80 and is sealed by a cover member 104.

The torque converter assembly 106 is housed within the second cover portion 98 and includes a driven rotor 108 and a driving rotor 110. A cover 112 is provided for enclosing the torque converter 106 within the second cover portion 98 of the transmission apparatus 80. As the construction and operation of a torque convertor 106 is well known, further details regarding the construction of the torque convertor 106 will not be described herein except for its connection to the transmission apparatus 80 of the present invention.

A valve manifold, denoted by reference number 114, is attached to the first cover portion 96 of the transmission apparatus 80 and is formed with suitable valving means and fluid flow passages, not shown, for operating the transmission apparatus 80 in a conventionally known manner. An oil pan 116 is mounted to the lower portion of the first cover portion 96 of the transmission 80. Finally, as shown in FIG. 8A, a differential clutch assembly 118 is optionally provided for connecting the transmission apparatus 80 to the differential 88 of the vehicle. As is conventional, the differential clutch assembly 118 includes a differential drive or output shaft 120 on which is mounted a differential clutch 122 and a differential brake band 124. As the construction of the differential clutch assembly 118 is conventional and is optional depending upon the application, further details regarding the differential clutch assembly 118 are not provided.

The transmission apparatus 80 also includes a gear train which is operative to transmit rotational output from the engine 90 to rotation of the differential 88 so as to propel the front wheels 84 and 86 of the vehicle. In the engine configuration illustrated in FIG. 7, the engine 90 is mounted in front of the differential 88 such that the axes of rotation of the engine 90 and differential 88 are offset but parallel. To transmit rotational output from the engine 90 to the differential 88, the gear assembly of the transmission apparatus 80, as illustrated in FIGS. 8A, 8B and 9 includes an input gear train 132, an output gear train 134 and a floating gear train 136. The input gear train 132 and the floating gear train 136 and the floating gear train 136 and the output gear train 134 are connected in the same manner as that depicted in the embodiments illustrated in FIGS. 2 and 4. The floating gear train 136 is offset from the input and output gear trains 132 and 134 and is selectively engageable with the input and output gear trains 132 and 134 for transmitting rotation in the desired gear ratio therebetween, as will be described in greater detail hereafter.

The input, output and floating gear trains 132, 134 and 136 each include a primary gear, such as primary gears 138, 140 and 142, respectively, which are each mounted on a rotatable shaft. The rotatable shafts of each of the input, output and floating gear trains 132, 134 and 136 have offset axes of rotation. A plurality of secondary gear pairs, each including first and second secondary gears, are respectively associated with the input and floating gear trains 132 and 136 and the floating and output gear trains 136 and 134. As illustrated in FIG. 9, three secondary gear pairs 144, 146 and 148 are associated with the primary gears 138 and 142 of the input and floating gear trains 132 and 136, respectively. Coupling means, denoted symbolically by reference number 150 and described in greater detail hereafter, are provided for coupling the secondary gears of each secondary gear pair 144, 146 and 148 for simultaneous rotation. One secondary gear of each secondary gear pair 144, 146 and 148 may also be continually engaged with its primary gear, with the other secondary gear being brought into engagement with its primary gear and coupled with its associated secondary gear when a particular gear ratio is selected.

It will also be noted that the second secondary gears of secondary gear pairs 144 and 148 are arranged in a reversed idler configuration such that when secondary gear pair 144 is coupled and engaged with the primary gear 138 and secondary gear 172, which is disengaged from its pair gear 170 and is engaged with primary gear 142, a reversed mode of operation may be provided for the transmission apparatus 80.

A plurality of secondary gear pairs, such as secondary gear pairs 152, 154, 156 and 158, are provided for selective coupling and engagement with the primary gears 140 and 142 of the output and floating gear trains 134 and 136, respectively. Each of the secondary gear pairs 152, 154, 156 and 158 includes first and second secondary gears which are respectively associated for selective engagement with the primary gears 142 and 140 of the floating and output gear trains 136 and 134.

An output gear 160 is mounted on a rotatable shaft and coupled to the differential clutch assembly 118 for connecting output driving force from the transmission apparatus 80 to the differential clutch assembly 118 for propelling the vehicle.

Thus, in the embodiment depicted in FIGS. 8 and 9, two forward and one reverse gear ratios are provided in a first state between the input and floating gear trains 132 and 136. Four gear ratios are provided in a second stage between the floating and output gear trains 136 and 134, respectively, so as to provide eight forward and one reverse gear ratios for the transmission apparatus 80. It will be understood that any number of gear ratios may be provided by incorporating the desired number of secondary gear pairs between the input, output and floating gear trains of the transmission apparatus 80.

Figure 10:
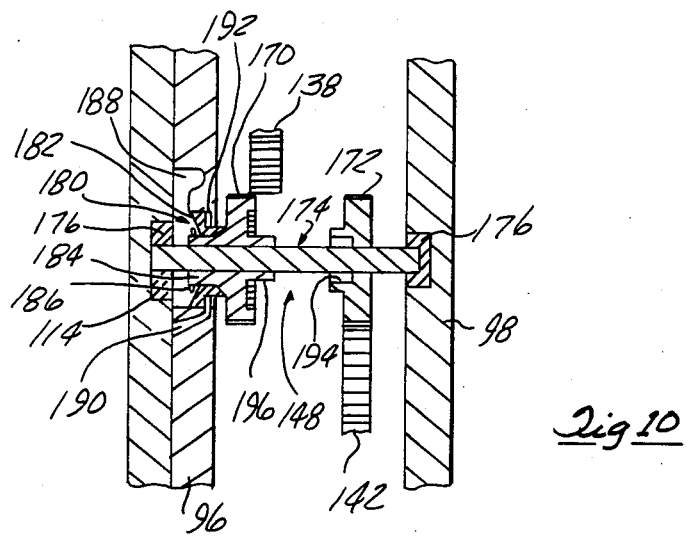
FIG. 10 is a partial, cross sectional view, generally taken along line 10—10 in FIG. 8A, showing one embodiment of the means for coupling a pair of secondary gears together.

Referring now to FIG. 10, there is illustrated one embodiment of the means for coupling the first and second gears of each pair of secondary gears together for simultaneous rotation and engagement with primary gears of the transmission apparatus 80 of the present invention in which the components are depicted out of scale for clarity purposes. As shown in FIG. 10, secondary gear pair 148, comprising first and second gears 170 and 172, is associated with the primary gear 138 of the input gear train and the primary gear 142 of the floating gear train. The secondary gears 170 and 172 are mounted on a shaft 174 which is rotatably mounted in bearings 176 disposed in the second housing portion 98 and the valve manifold 114. The secondary gear 172 is fixedly secured to the rotatable shaft 174 and is maintained in constant engagement with the primary gear 142 of the floating gear train 136. The secondary gear 170 is slidably disposed about the rotatable shaft 174.

Means, denoted in general by reference number 180, are provided for moving the secondary gear 170 between a disengaged position, depicted in FIG. 10, to an engaged position with the secondary gear 172. In a preferred embodiment, the moving means 180 comprises an annular piston 182 which is disposed about and fixedly secured to an outwardly extending boss 184 formed on the secondary gear 170. Suitable fastening means, such as a snap ring 186, is provided for securely mounting the piston 182 on the outwardly extending boss 184 of the secondary gear 170. Thus, movement of the piston 182 as described hereafter, will correspond to sliding movement of the secondary gear 170 along the rotatable shaft 174.

Fluid flow passageways or conduits 188 and 190 are formed in the front cover portion 96 of the transmission housing and communicate with integrally mounted valves, not shown, on the valve manifold 114. The fluid flow passageways 188 and 190 communicate with an enlarged bore 192 formed in the front cover 96 through which the piston 182 moves. Thus, fluid flow passageway 188 is disposed in communication with the rear face of the piston 182; while the corresponding fluid flow passageway 190 is disposed in communication with the opposed forward face of piston 182. In this way, fluid under pressure may be directed to either side of the piston 182 so as to move the piston 182 and the secondary gear 170 attached thereto in forward or reverse directions along the rotatable shaft 174 from a disengaged position, shown in FIG. 10, to an engaged position with the secondary gear 172.

In one embodiment, the means for coupling the secondary gears, such as secondary gears 170 and 172 of the secondary gear pair 148 together, also includes complimentary formed interconnecting means. As shown in FIG. 10, the interconnecting means comprises an internal cog 194 formed in the secondary gear 172 which mates with an external cog wheel 196 formed on the opposed secondary gear 170. Thus, as the secondary gear 170 moves along the rotatable shaft 174, the external cog 196 will be slidingly received within the internal cog 194 to couple the secondary gears 170 and 172 into secure engagement so as to transmit rotation of the first secondary gear 170 to the second secondary gear 172. Optionally, the rotatable shaft 174 and an internal bore formed in the first secondary gear 170 can be formed with complimentary splines so as to permit sliding movement of the secondary gear 170 therealong and at the same time to transmit rotation of the secondary gear 170 to the rotatable shaft 174. As a result of this coupling arrangement, when the first secondary gear 170 has been moved to a position engaging the first primary gear 138 and the opposed second secondary gear 172, rotation of the first primary gear 138, as described above, will result in simultaneous rotation of the secondary gears 170 and 172 which will, in turn, be transmitted to rotation of the primary gear 142. In this manner, selection of one of the first secondary gears of a pair of secondary gears associated with the input and floating gear trains 132 and 136 and the floating and output gear trains 136 and 134 will select one of the predetermined gear ratios formed by the secondary gear pairs and primary gears of the input, floating and output gear trains 132, 136 and 134 so as to select the desired gear ratio for the transmission apparatus 80 of the present invention.

Figure 11:
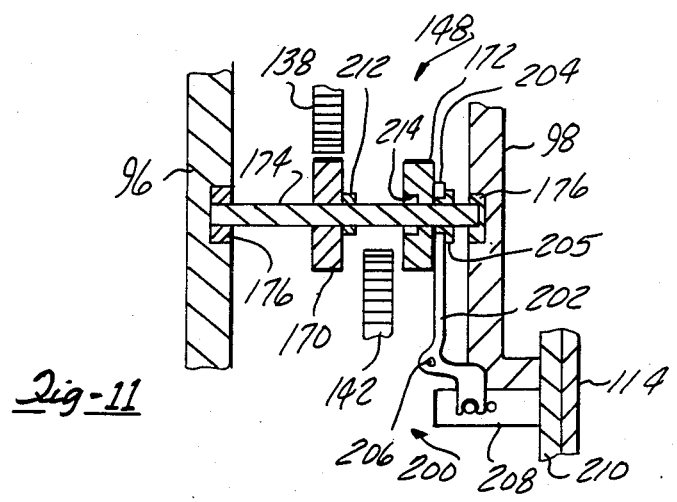
FIG. 11 is a partial, cross sectional view, similar to that depicted in FIG. 10, showing another embodiment of the means for coupling a pair of secondary gears together.

Referring now to FIG. 11, there is illustrated another means for coupling the secondary gears of each pair of secondary gears together for simultaneous rotation. In this embodiment, it should be noted that the valve manifold 114 is associated with and secured to the second cover portion 98 of the transmission housing. Furthermore, in this embodiment, the first secondary gear 170 of the secondary gear pair 148 is fixedly secured or journalled to the rotatable shaft 174. The rotatable shaft 174 is mounted in bearings 176 disposed in the first and second cover portions 96 and 98 of the transmission housing. The second secondary gear 172 of the secondary gear pair 148 is adapted for sliding movement along the rotatable shaft 174.

The means for moving the second secondary gear 172 along the shaft 174 is provided by a fork assembly 200 which is formed with opposed leg portions 202 which terminate in end portions 204 disposed on opposed sides of a boss 205 affixed to gear 172. An intermediate portion of the fork 200 is pivotally secured to the transmission housing by means of a pin, not shown, which extends through apertures 206 formed in the leg portions 202. The lowermost portions of the legs 202 of the fork 200 are movably mounted to a two way hydraulic cylinder 208 which is controlled by a valve 210 mounted in fluid flow communication with the valve manifold 114 and each side of the cylinder 208 by fluid passages, not shown. In this manner, selective energization of the cylinder 208 will result in movement of the fork assembly 200 in either of two directions so as to move the second secondary gear 172 into or out of engagement with the primary gear 142 and the first secondary gear 170. Further coupling is provided by means of external splines formed on a boss 212 extending outward from the first secondary gear 170 which mate with correspondingly formed internal splines 214 formed interiorly within the secondary gear 172.

Thus, rotation of the first primary gear 138 will be transmitted to rotation of the first secondary gear 170. Engagement of the second secondary gear 172 with the first secondary gear 170 and primary gear 142 will transmit this rotation to the primary gear 142 in the same manner as described above.

As noted above, the fluid utilized to move the piston 182 illustrated in FIG. 10 or the cylinder 208 illustrated in FIG. 11 is controlled by means of a solenoid operated valve mounted in the valve manifold 114. Such valves are controlled by means of a suitable control means, preferably a microcomputer based control system, which has been programmed to select the proper gear ratio based on load and speed conditions and to sequence shifting of the transmission apparatus through various gear ratios. Such control apparatus is responsive to vehicle or machine speed, torque, throttle setting, engine RPM's and other parameters in order to provide the desired gear ratio selection and shifting sequence of the transmission apparatus of the present invention. The transmission apparatus of the present invention is also adaptable for use with a conventional manual gear selector and clutch assembly for sequencing the transmission apparatus through the various gear ratios.

Thus, there has been disclosed a unique transmission apparatus suitable for powering vehicles, such as automobiles and other machines. The transmission apparatus of the present invention may be configured with a plurality of selectable gear ratios which are arranged in a small compact space. The number of gear ratios may be selected to meet various engine and machine configurations so as to enable the transmission apparatus of the present invention to be used in a large number of applications.

What is claimed is:

1. A transmission comprising:
   first and second primary gears, each mounted on a rotatable shaft, the rotatable shafts having offset axes of rotation;
   a plurality of pairs of secondary gears, each pair of secondary gears including first and second secondary gears coaxially disposed for rotation about a common axis, the first secondary gear of each pair of secondary gears being adapted to engage the first primary gear and the second secondary gear of each pair of secondary gears being adapted to engage the second primary gear, each pair of secondary gears providing a distinct gear ratio when coupled to the first and second primary gears;
   means for coupling the first and second secondary gears of one of the pairs of secondary gears into rotational engagement with each other and with the first and second primary gears, the coupling means comprising:
   one of the first and second secondary gears of each pair of secondary gears being fixedly mounted on the rotatable shaft in engagement with one of the first and second primary gears;
   the other of the first and second secondary gears of each pair of secondary gears being slidingly disposed about the rotatable shaft;
   the first and second secondary gears of each pair of secondary gears being formed with complimentary means for interlocking the first and second secondary gears together for simultaneous rotation; and
   means acting directly on the other of the first and second secondary gears for moving the other of the first and second secondary gears along the rotatable shaft into and out of engagement with the one secondary gear of the pair of secondary gears and the primary gear associated with the slidingly disposed secondary gear; and wherein
   rotation of one of the rotatable shafts of one of the first primary gears and one of the pairs of secondary gears is transmitted to rotation of one of the rotatable shafts of the second primary gear and one of the pairs of the secondary gears.

2. The transmission of claim 1 further including:
   an idler gear disposed between one of the first and second secondary gears of one of the pairs of secondary gears and one of the first and second primary gears for reversing the direction of rotation of the second primary gear with respect to the first primary gear.

3. The transmission of claim 1 further including:
   a third primary gear mounted on a rotatable shaft; and
   a plurality of pairs of secondary gears, each including first and second secondary gears mounted for co-axial rotation about a common axis, the secondary gears of each second pair of secondary gears being adapted to engage the second and third primary gears, respectively.

4. The transmission of claim 1 wherein the moving means comprises:
   piston means mounted co-axially about the rotatable shaft of the one pair of secondary gears and fixedly secured to the other of the first and second secondary gears; and
   fluid control means disposed in communication with the piston for slidingly moving the piston in either of two directions along the rotatable shaft.

5. The transmission of claim 1 wherein the moving means comprises:
   a member fixedly secured at a first end to the other of the first and second secondary gears and pivotally mounted at an intermediate portion to the transmission; and
   two-way cylinder means;
   a second end of the member being secured to and moved by the two-way cylinder means in either of two directions so as to move the other of the first and second gears in either of two directions along the rotatable shaft.

6. The transmission of claim 1 wherein:
   at least one of the first and second primary gears includes a pair of co-axially disposed primary gears, each having a different diameter; and
   one of the first and second secondary gears of at least one pair of secondary gears includes at least two secondary gears, each adapted to engage one of the pair of primary gears.

* * * * *